United States Patent
More (10) Patent No.: US 6,419,237 B1
(45) Date of Patent: Jul. 16, 2002

(54) SPRING COMPRESSION SEAL

(75) Inventor: Dominick G. More, Middletown, CT (US)

(73) Assignee: The Advanced Products Company, North Haven, CT (US)

( * ) Notice: Subject to any disclaimer, the term of this patent is extended or adjusted under 35 U.S.C. 154(b) by 0 days.

(21) Appl. No.: 09/647,853

(22) PCT Filed: Aug. 19, 1999

(86) PCT No.: PCT/US99/18791
§ 371 (c)(1),
(2), (4) Date: Oct. 3, 2000

(87) PCT Pub. No.: WO00/11379
PCT Pub. Date: Mar. 2, 2000

Related U.S. Application Data (60) Provisional application No. 60/097,466, filed on Aug. 21, 1998.

(51) Int. Cl.[7] ................................................ F16L 17/00
(52) U.S. Cl. .................... 277/602; 277/277; 277/603; 277/612; 277/637; 277/644; 277/649
(58) Field of Search ................................. 277/602, 603, 277/606, 612, 616, 637, 644, 649, 941, 942, 946

(56) References Cited

U.S. PATENT DOCUMENTS

| | | |
|---|---|---|
| 1,926,107 A | 9/1933 | Morehead |
| 2,211,983 A | 8/1940 | Parris |
| 2,422,009 A | 6/1947 | Goetze |
| 3,033,582 A | 5/1962 | Creavey |
| 3,339,948 A | 9/1967 | Weitzel |
| 3,479,063 A | 11/1969 | Raver |
| 3,531,133 A | 9/1970 | Sheesley et al. |
| 3,820,830 A | 6/1974 | Dryer |
| 3,836,159 A | 9/1974 | Dryer |
| 3,888,496 A | 6/1975 | Dryer |
| 3,930,656 A | 1/1976 | Jelinek |
| 4,218,080 A | 8/1980 | Kendrick |
| 4,406,467 A | 9/1983 | Burger et al. |
| 4,477,087 A | * 10/1984 | Sutter et al. ................. 277/644 |
| 4,690,438 A | 9/1987 | Kanczarek |
| 4,776,600 A | 10/1988 | Kohn |
| 4,848,806 A | 7/1989 | Miller |
| 5,482,082 A | 1/1996 | Turner et al. |

FOREIGN PATENT DOCUMENTS

EP 0867647 A2 9/1998

* cited by examiner

*Primary Examiner*—Anthony Knight
*Assistant Examiner*—Enoch E Peavey
(74) *Attorney, Agent, or Firm*—Wiggin & Dana; William B. Slate (57) ABSTRACT

Seal (20) is formed in two halves (22A, 22B) mated along a transverse centerplane (502). Each half faces outward from an associated side of centerplane (502) and includes centrally apertured (100) metal body (22A, 22B). Each body has an outwardly projecting hub (24A, 24B) having an outward-facing engagement surface (25A, 25B). A web (26A, 26B) extends radially outward from the hub (24A, 24B) to a perimeter and has interior and exterior surfaces. Bodies (22A, 22B) are secured to each other by an annular weld (40) to form a seal body. A longitudinal separation between the engagement surfaces (25A, 25B) is compressible via flexing of webs (26A, 26B) from relaxed separation to a range of compressed separations. In the compressed separation, the surfaces are sealingly engaged to respective ones of the first (44A, 44B) and second (45A, 45B) conduits. On each side of seal (20) there may be two polymeric sealing rings 44A, 44B) and an annular retainer (66A, 66B). Caps (67A, 67B) having an inboard portion covering a portion of the outboard sealing ring. At least one annular collar (78A, 78B) depends from cap (67A, 67B).

20 Claims, 5 Drawing Sheets

SPRING COMPRESSION SEAL

This is the 35 U.S.C. 371 U.S. National Phase of PCT/US99/18791 entitled "SEAL" which was filed Aug. 19, 1999 and published in English on Mar. 2, 2000 and which claims priority of U.S. Provisional Patent Application Ser. No. 60/097,466 entitled "SEAL" which was filed Aug. 21, 1998.

This invention relates to seals, and more particularly to seal constructions useful in hydraulic couplings and the like wherein an internal liquid pressure is maintained above an external pressure.

A variety of annular seals suitable for the sealing of fluid conduits exist. One common seal is the NAFLEX seal, a self-biasing metallic seal.

One application for annular seals lies in the field of hydraulics, particularly in hydraulic couplings used in the undersea oil drilling industry. In that industry, complex arrangements of valves, known as "Christmas trees" are hydraulically actuated from the above-water portion of an associated drilling rig. Long hydraulic fluid lines extend from the rigs to the "Christmas trees" and are connected thereto by means of quick connect/disconnect hydraulic couplings. Examples of such couplings are disclosed in U.S. Pat. No. 5,482,082 of Edwin C. Turner and Danny K. Wolff, the disclosure of which is incorporated herein by reference in its entirety. Turner et al. discloses the use of a first group of annular seals carried within the housing of female coupling moiety and a second group of seals carried within a closure slide of the mating male coupling moiety. The seals of the first group are of modified NAFLEX design whereas the seals of the second group have a cross-sectional profile largely radially inverted relative to that of the first group.

Many other seal constructions exist. Among these, are polymeric seals. One group of polymeric seals is spring energized polymeric seals. These include seals utilizing a helical metallic energizing spring. An example of a spring-energized polymeric seal is shown in European Patent Application EP 0867647 of John Crane, U.K. Limited.

In one aspect, the invention is directed to an apparatus for forming a seal between first and second conduits. The apparatus may be formed in two halves mated along a transverse center plane. Each half may face outward from an associated side of the center plane and may include a centrally apertured metal body. The metal body has an outwardly projecting hub having an outward-facing engagement surface. A web extends radially outward from the hub to a perimeter and has interior and exterior surfaces. The two bodies are secured to each other such as by an annular weld so that their combination forms a seal body. A longitudinal separation between the engagement surfaces is compressible via a flexing of the webs from a relaxed separation to a range of compressed separations. In the compressed separations, the surfaces are sealingly engaged to respective ones of the first and second conduits.

In various implementations, the metal bodies may consist essentially of a nickel superalloy plated with a more malleable material such as gold, silver or copper. The seal may optionally include an annular stop sleeve having opposite ends within the hubs of the seal bodies. A sleeve length may be less than the relaxed separation but greater than a combination of the hub lengths so as to prevent compression of the longitudinal separation below a safe minimum value whereby damage to the seal may be avoided.

In another aspect, the invention is directed to an apparatus for forming a seal between first and second elements. The apparatus includes first and second annular polymeric sealing members, each having a first surface for sealingly engaging the first element and a second surface for sealingly engaging the second element. An annular retaining member has an annular cap portion having an inboardmost portion covering a portion of the first sealing member outboard of the first surface of the first sealing member. An outboardmost portion of the annular cap portion covers a portion the sealing member inboard of the first surface of the second sealing member. The retaining member includes at least one annular collar portion depending from the cap portion and directed toward the second element.

In various implementations, an additional annular collar portion formed integrally with the second element may be intermeshed with at least one collar portion of the annular retaining member and project toward the cap portion thereof. First and second such collar members of the annular retaining member may be intermeshed with one such additional collar member between them. Such an apparatus may provide a seal between a seal body and a valve body in a valve. A pair of such apparatus may provide a seal system, the second elements being provided by first and second halves of a metallic seal body and the first elements being the two elements to be sealed by the seal system.

Among the advantages of the invention is enhanced longitudinal compactness. The two-piece welded construction allows the disks to be located closer together than in a similar one-piece NAFLEX construction. This longitudinal compactness further facilitates the addition of the polymeric sealing rings on one or both sides of the seal.

The details of one or more embodiments of the invention are set forth in the accompanying drawings and the description below. Other features, objects, and advantages of the invention will be apparent from the description and drawings, and from the claims.

Like reference numbers and designations in the various drawings indicate like elements.

Figure 1:
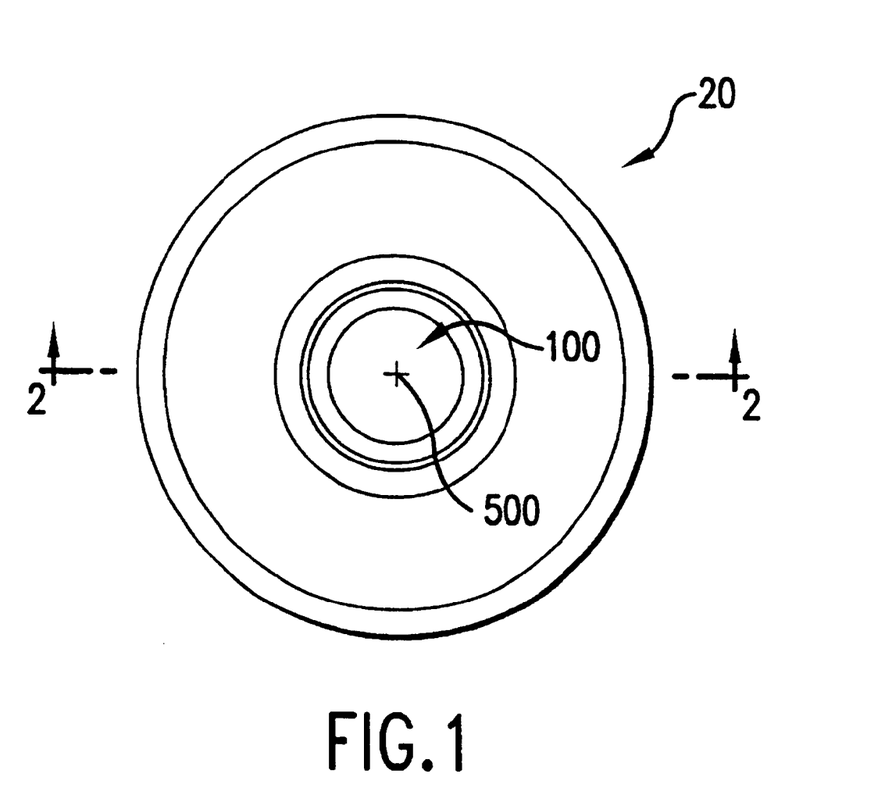
FIG. 1 is a plan view of a seal according to principles of the invention.
Figure 2:
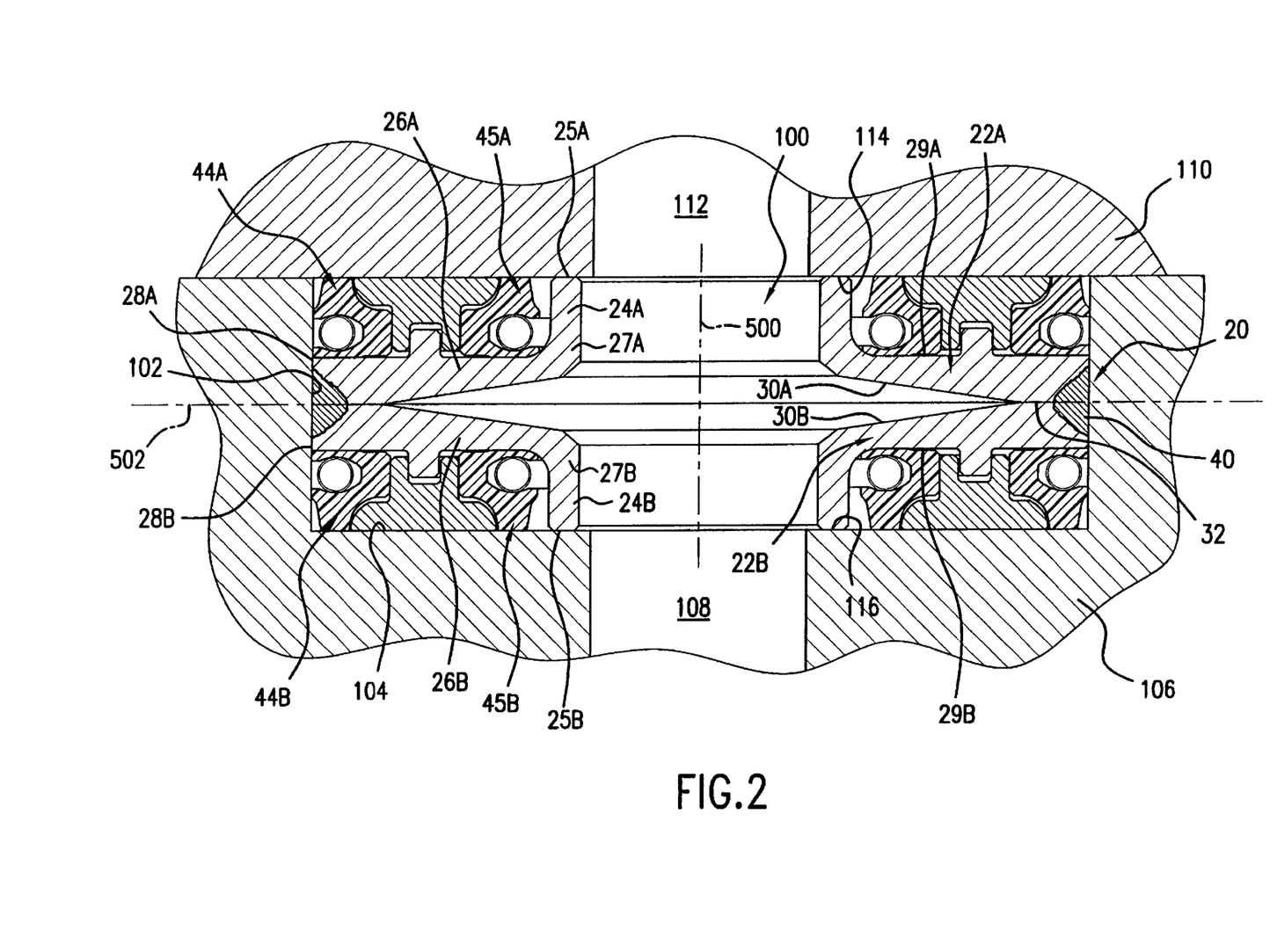
FIG. 2 is a partial cross-sectional view of the seal of FIG. 1, taken along line 2—2.

FIG. 1 shows a seal 20 having a generally annular configuration. A central aperture 100 in the seal 20 bounds a flow path through the seal. The seal 20 has a central longitudinal axis 500 and a transverse center plane 502 (FIG. 2). In the exemplary embodiment, the seal is substantially symmetric about the transverse centerplane 502 and about the central longitudinal axis 500. For ease of reference, and unless dictated otherwise, the terms inward and outward as applied to the seal and its components shall be treated as directed along the axis 500. With the illustrated embodiments symmetric about the transverse center plane 502, inward indicates a direction towards such center plane and outward indicates a direction away from such center plane. Similarly, as applied to the seal and its components, the terms inboard and outboard shall have reference to the axis 500.

The seal 20 is advantageously accommodated within a cylindrical pocket in one of two members (typically conduits) between which a seal is to be made. In the exemplary application illustrated in FIG. 2, the pocket is defined by a cylindrical lateral surface 102 and an annular base surface 104 in a housing 106 of a female hydraulic coupling moiety. A channel 108 in the housing 106 is coaxially aligned and in fluid communication with the aperture 100. With the housing 106 as the first member, the second member may be the body 110 of the mating male hydraulic coupling moiety. The body 110 has a channel 112 coaxially aligned and in fluid communication with the aperture 100 when the male and female coupling moieties are fully mated or engaged. The coupling moieties may be constructed as shown in U.S. Pat. No. 5,482,082 and similar seals to seal 20 may be used in the closure slide of such coupling.

The seal 20 has a body formed by the combination of a pair of metallic seal disks 22A and 22B facing outward from opposite sides of the transverse center plane 202. Each disk 22A, 22B has a hub 24A, 24B formed as an outwardly projecting sleeve-like nipple having a flat annular outer surface 25A, 25B. The disk body or web 26A, 26B extends radially outward from the root 27A, 27B of each hub to a circumferential periphery or perimeter 28A, 28B and has respective exterior and interior surfaces 29A, 29B and 30A, 30B. Each interior surface is, over a majority of its radial span, approximately frustoconical, having a relatively shallow cone angle θ of about 800 (preferably about 75° to about 850). The interior surfaces 30A and 30B of the two disks 22A and 22B meet at an annular vertex along the center plane 202. The disks 22A and 22B contact each other along an outboard annular contact zone 32 which advantageously covers a relatively small radial extent, e.g., within the outboardmost 15% of the seal (more broadly preferably along less than 20% of the radial extent). At their circumferential peripheries 28B, 28B, the disks are secured to each other such as via a weld bead 40 formed by melting of the two disks 22A and 22B.

Flexion of the webs 26A, 26B provides an outward biasing force when the hubs 24A. 24B are longitudinally compressed toward each other from a relaxed separation to a range of compressed separations. When installed in the seal's operational setting such as the illustrated coupling, the assembled seal body is compressed between the two conduits (e.g., the male and female coupling moieties). In particular, the annular outer surface 25A of the first disk 22A provides an engagement surface in contact with an associated annular surface 114 of the coupling body 110 circumscribing the channel 112. The outward biasing force provided by the web flexion maintains such surfaces in sealing engagement. Similarly, the annular outer surface of the second disk 22B is sealingly engaged to an annular surface 116 of the coupling housing 106 circumscribing the channel 108. The surface 116 forms a central portion of the surface 104. In the illustrated embodiment, the surface 104 is substantially planar from a slight fillet at a junction with the surface 102 radially inward to the channel 108.

The disks 22A and 22B are advantageously formed of a high strength, highly corrosion-resistant and galling-resistant metal. A preferred metal is sold by INCO Alloys International, Inc. under the trademark INCONEL Alloy 725 (UNS N07725), a nickel-chromium-molybdenum-niobium alloy that is highly resistant to corrosion and is age hardenable for extremely high strength. This material's nominal composition, by weight titanium 1.0–1.7; aluminum 0.35 max.; carbon 0.03 max.; manganese 0.35 max.; silicon 0.20 max.; phosphorus 0.015 max.; sulfur 0.010 max.; and iron balance. Other "superalloys" having a nickel base and significant amounts of iron and chromium (for corrosion resistance) may also provide advantageous performance. High strength, high gall-resistance stainless steels such as that sold under trademark ULTIMET by Haynes International, Inc. of Kokomo, Ind. may also be used.

Given the hardness of the disks 22A and 22B and the coupling housing 106 and coupling body 110, direct contact between the superalloy of the disks and the mating surfaces 114 and 116 may have insufficient accommodation to provide an adequate seal in the presence of surface asperities (e.g., microscratches and tool marks), surface contaminations, etc. Thus, advantageously, the assembled seal body is coated with a material which provides a degree of accommodation between the annular outer surfaces 25A, 25B of the hubs and their mating surfaces 114 and 116 and can fill surface asperities of the disks. Platings of gold, silver, copper, their mixtures and alloys may be advantageous for this purpose. Exemplary plating thicknesses are in the range 0.25 mils to 3 mils (6 $\mu$m to 75 $\mu$m). A preferred plating is an electrolytic plating of 0.5 mils (13 $\mu$m) of 99+% pure silver. Such a plating is less expensive than gold yet more corrosion resistant than copper. Although its sealing properties are utilized only along the annular outer surfaces 25A, 25B, the plating advantageously covers the entire seal body. This reduces the inducement to peel formed at the boundaries of discrete platings. Other metals having similar malleability and wear resistance properties may be utilized.

Figure 3:
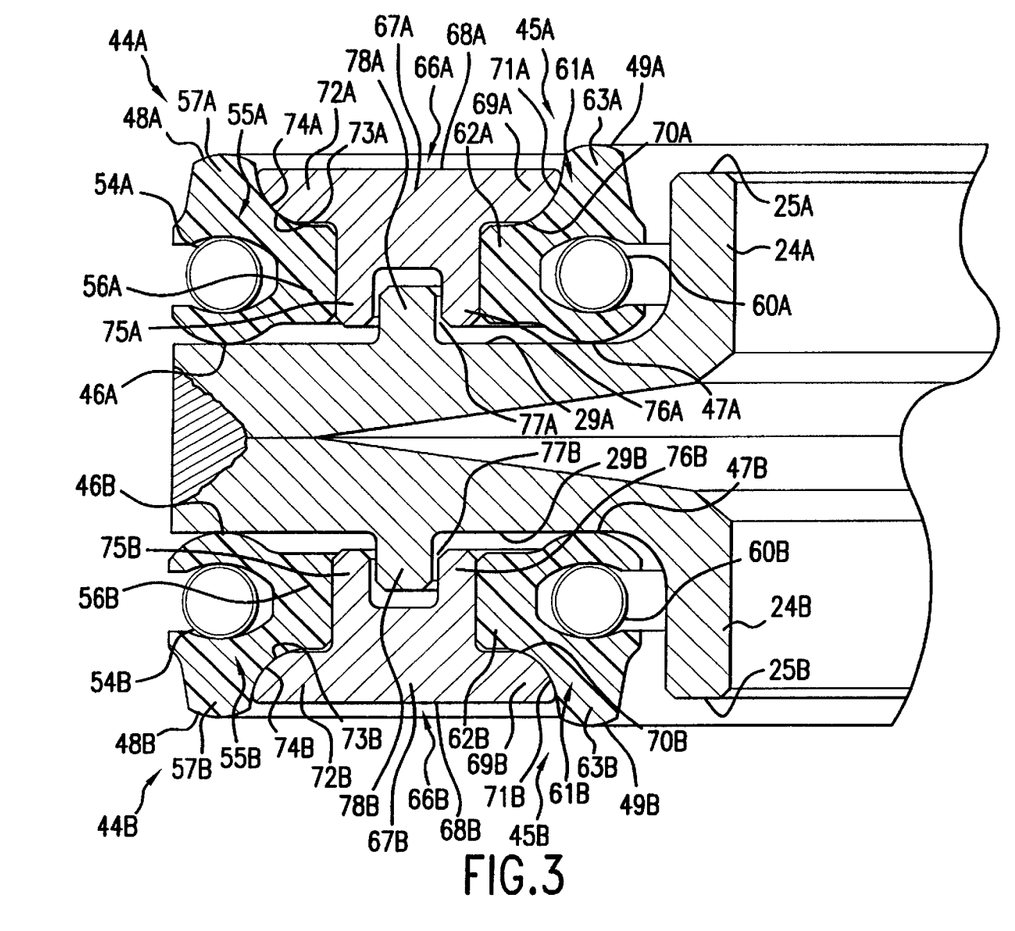
FIG. 3 is a partial cross-sectional view of the seal of FIG. 2.

In addition to the sealing provided by the annular outer surfaces 25A, 25B of the hubs to the mating surfaces of the associated conduits, further sealing may be provided by polymeric rings. The additional sealing is provided by first and second pairs of outboard and inboard rings 44A, 44B and 45A, 45B. One pair of rings 44A and 45A is held between the outer surface of the disk 22A and a surface of the body 110. Another such pair 44B and 45B is similarly held between the outer surface of the second disk 22B and the surface 104. FIG. 3 shows further details of the rings 44A, 44B and 45A, 45B. The inboard and outboard rings 44A, 44B and 45A, 45B have respective surface portions 46A, 46B and 47A, 47B for sealing with the associated disk outer surface 29A, 29B. They also have respective surface portions 48A, 48B and 49A, 49B for sealingly engaging the respective surfaces 114 and 116. Each outboard ring 44A, 44B includes a coiled (helical) sheet metal energizing spring 54A, 54B carried within an outboard-facing (i.e., radially outward) channel or compartment in a polymeric jacket 55A, 55B. The jacket has an inboard (i.e., radially inward projecting) heel 56A, 56B and an outwardly-projecting lip 57A, 57B. In the exemplary embodiment, the ring 44A, 44B is formed as a modified external pressure face seal such as is sold by Advanced Products Company, Inc. of North Haven, Conn. under the trademark NHE Mark 1-H. The jacket 55A, 55B of such seal is a modified polytetrafluoroethylene (PTFE). The ring 44A, 44B differs from the stock face seal only in the presence of the lip 57A, 57B. The inboard ring 45A, 45B represents a similar modification of an Advanced Products Company, Inc. NHI Mark 1-H internal pressure face seal having an energizing spring 60A, 60B carried within an inboard compartment of a polymeric jacket 61A, 61B having an outboard heel 62A, 62B and an outwardly-projecting lip 63A, 63B. It is noted that the drawings show the rings 44A, 44B and 45A, 45B and their jackets 55A, 55B and 61A, 61B in relaxed states thus appearing to interfere or overlap with the various metal elements. The polymeric material is compressed by any contacting metal elements (e.g., the seal disks) into a deformed state.

Shown in FIG. 3, associated with each pair of rings 44A, 44B and 45A, 45B is a retaining member 66A, 66B which helps position such rings as described below. The retaining member 66A, 66B is advantageously formed of a metal such as bronze, aluminum-bronze, nickel-aluminum-bronze or stainless steel. Viewed in longitudinal cross-section, the retaining member 66A, 66B includes a cap or top portion 67A, 67B having a flat annular top or outer surface 68A, 68B. An inboardmost portion 69A, 69B of the cap portion covers the heel portion 62A, 62B of the jacket 61A, 61B of the ring 45A, 45B. The underside 70A, 70B of the inboardmost portion 69A, 69B curves inboard and outward for a smooth engagement with a surface portion 71A, 71B the jacket adjacent a juncture of the heel 62A, 62B and lip 63A, 63B. Similarly, an outboardmost portion 72A, 72B covers the heel 56A, 56B of the jacket 55A, 55B of the ring 44A, 44B with undersides 73A, 73B engaging surface portions 74A, 74B. Respective outboard and inboard annular collar portions 74A, 74B and 76A, 76B depend from the top portion 67A, 67B. A channel 77A, 77B is formed between the collar portion 74A, 74B and 76A, 76B. The channel 77A, 77B accommodates a lip or additional collar portion 78A, 78B formed integrally with the associated disk 22A, 22B and projecting outward from the outer surface 29A, 29B thereof. The lip 78A, 78B forms a track on which the retaining number 66 can ride to maintain the retaining member substantially in coaxial alignment with the seal body.

In operation, the rings 44A, 44B and 45A, 45B provide a supplemental seal to that provided by the engagement of the hubs 24A, 24B with their associated female coupling housing and male coupling body. Such additional sealing is particularly useful in situations of damage to the outer hub surfaces 25A, 25B (including to any plating thereon) or to the engagement surfaces 114 and 116 of the male coupling body and female coupling housing. Particulate contamination of such surfaces can occur if a seal is not maintained with sufficient force (e.g., damage to the coupling increases the separation between surfaces 114 and 116 by an excessive amount or disturbs their alignment). In such situations, the relatively high compliance and compressability of the rings 44A, 44B and 45A, 45B, can maintain a seal. In particular, the ring 44A, 44B is advantageous to prevent infiltration from outside of the flowpath defined by the channel 108, aperture 110 and channel 112. For example, the ring 44A, 44B helps prevent the infiltration of seawater when there is a relatively low pressure within the seal. The inboard ring 45A, 45B is oriented to provide its best sealing against exit of fluid from within to without the seal, e.g., to prevent further leakage of relatively high pressure hydraulic fluid which may leak past the hub 24A, 24B. One advantage of the construction of the illustrated retaining member 66A, 66B is that the respective outboard and inboard collar portions 74A, 74B and 76A, 76B help maintain the shape of the ring jackets 55A, 55B and 61A, 61B. In particular, the collar portions 74A, 74B and 76A, 76B resist tendencies of the heels 56A, 56B and 62A, 62B to respectively extrude in inboard and outboard directions, respectively, when under load.

The seal 20 may be dimensioned for the particular use to which it is put. In the exemplary hydraulic coupling use, an outer diameter range of from about three quarters of an inch to about two and one half inches is advantageous. In an exemplary size, the seal 20 is dimensioned to be accommodated within a cylindrical compartment having a diameter of seven eighths of an inch and a compartment depth of about 0.258 inches. The relaxed separation between surfaces 25A and 25B is slightly greater than this compartment depth (e.g., about 0.263 inches). The central aperture 100 has a diameter of about three sixteenths of an inch within the hubs 24. A preferred target compressed range of separation between the surfaces 25 is from about 97% to about 99% of the relaxed separation for desired sealing parameters. A broader preferred range is from about 95% to 99+%.

Figure 4:
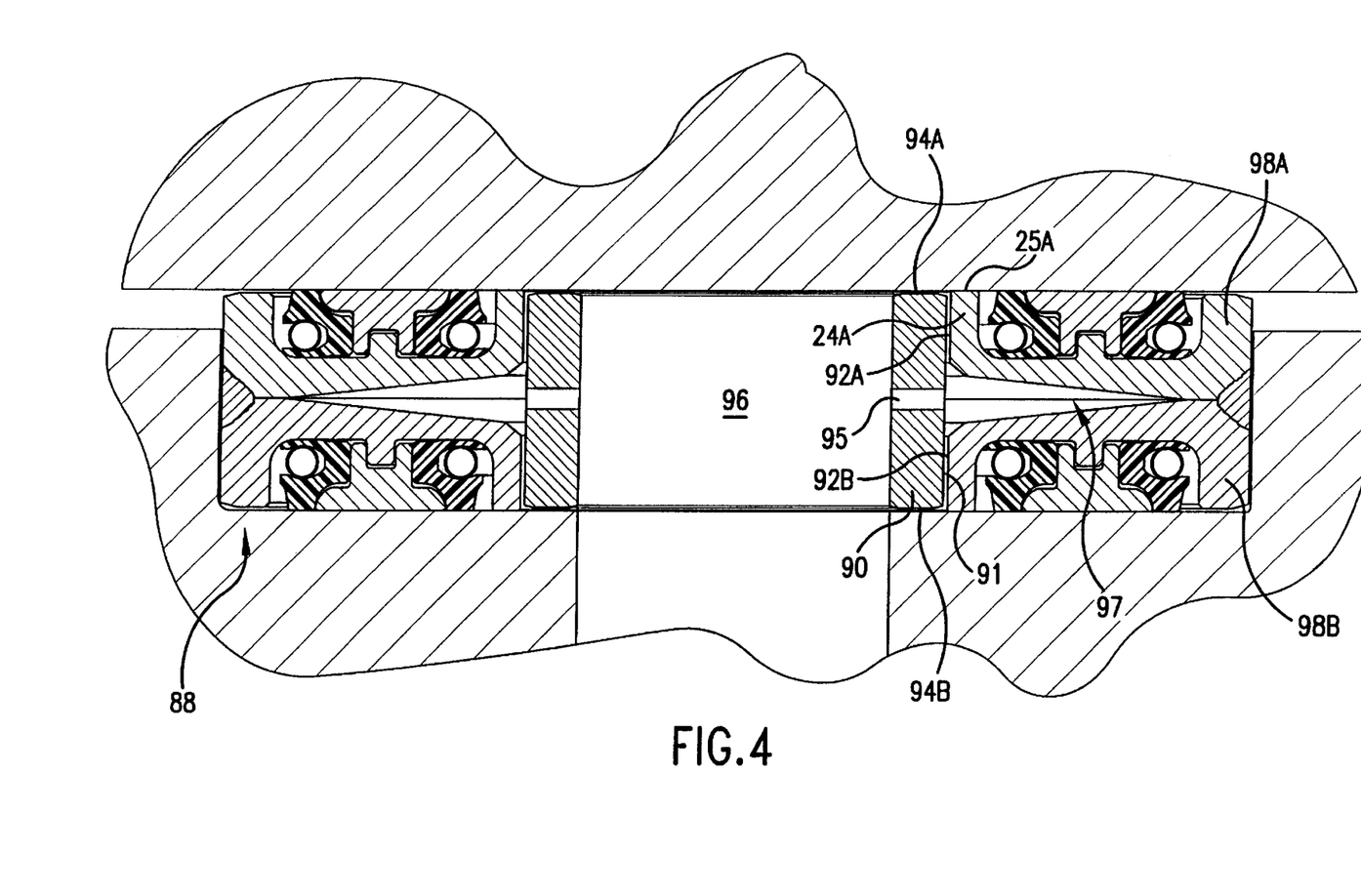
FIG. 4 is a cross-sectional view of an alternate seal according to principles of the invention.

FIG. 4 shows an alternate seal 88 which, in addition to the features of the seal of FIGS. 1–3 includes a rigid metal stop sleeve or bushing 90 accommodated within the seal body. A cylindrical exterior surface 91 of the sleeve is in close facing relation to cylindrical interior surfaces 92A, 92B of the hubs 24A, 24B. The sleeve 90 has a pair of annular end faces 94A, 94B having a longitudinal separation well less than the relaxed separation of the engagement faces 25A, 25B of the hubs. The sleeve serves to prevent movement of the two coupling members toward each other before reaching a point at which the seal would be damaged. By way of example, the stop length is about 2% less than the relaxed separation between the surfaces 25A, 25B. The stop length is advantageously at or near the lower end of the target compressed range of separations.

The sleeve 90 includes a number of radially extending passageways 95 which allow for an equalization of pressure between the interior 96 of the sleeve and the space 97 between interior surfaces of the webs. Additionally, each disk may be provided with an annular longitudinally outward projecting peripheral rim 98A, 98B. The rim serves to additionally limit overcompression of the seal as does the sleeve. In an exemplary size, the seal 88 is dimensioned to be accommodated within a compartment having a diameter of about 1.264 inches. The sleeve has an interior diameter of about three eighths of an inch on a external diameter of about one half of an inch. The relaxed separation between the annular outer hub faces is about 0.278 inches and the overall diameter of the seal is about 1.255 inches.

Optionally, similarly shaped seal bodies may be formed as a single unitary piece (rather than as two welded pieces) via any suitable process such as an electrical discharge machining (EDM).

Figure 5:
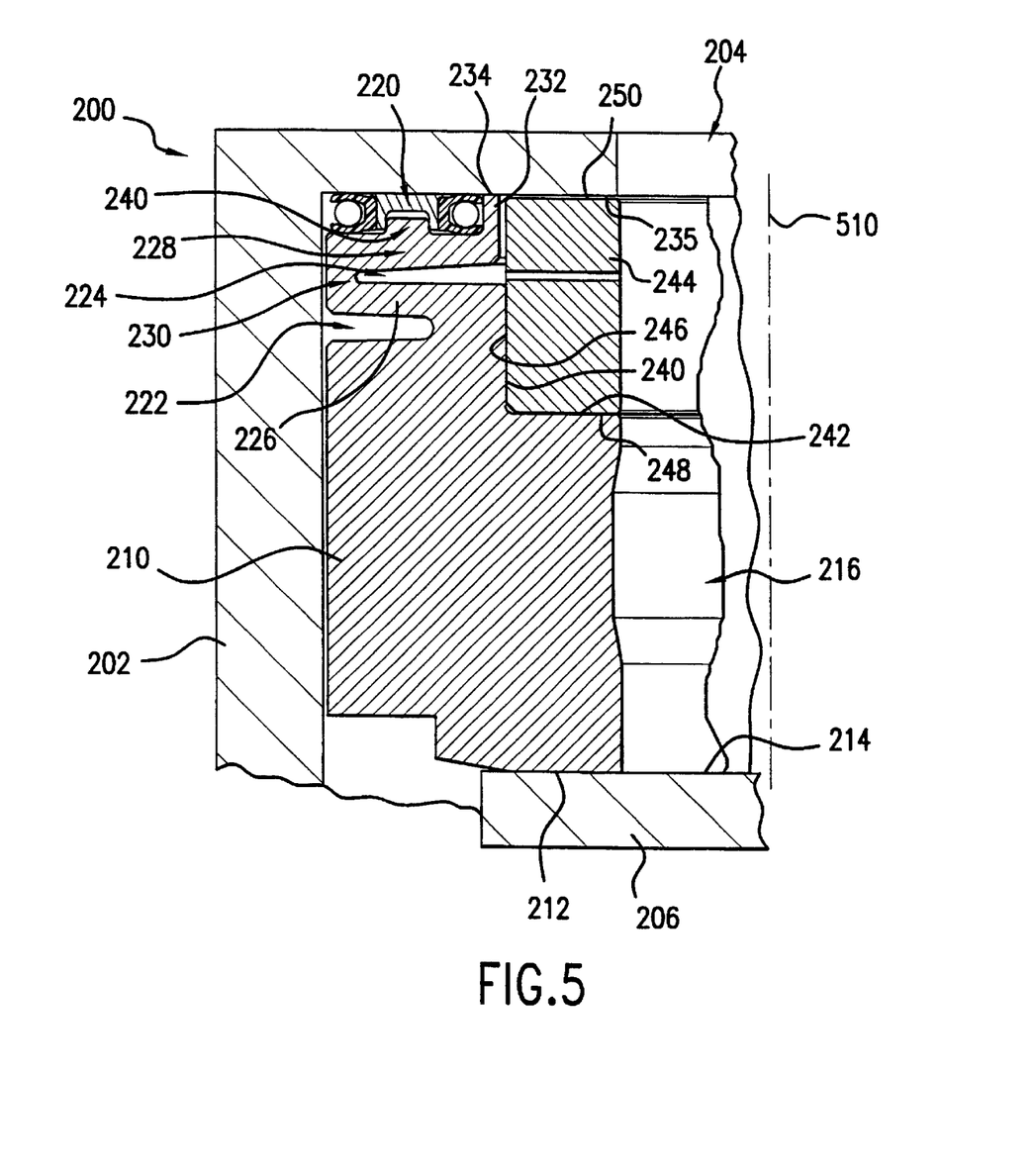
FIG. 5 is a cross-sectional view of another alternate seal according to principles of the invention.

Although the seal may have the aforementioned symmetry about the transverse centerplane, the inventive features may be applied in configurations lacking such symmetry. By way of example, FIG. 5 shows a portion of a gate valve 200 in which the inventive seal may be utilized. The valve 200 includes a body 202 which extends along a central axis 510. The valve may include inlet and outlet ports (of which a single port 204 is shown). The valve includes a gate 206 which may be moved transverse to the axis 500 between open and closed positions of which the latter is illustrated. A metallic seal body 210 has a first end with a first annular surface 212 which contacts and seals with a first surface 214 of the gate 206 when the latter is closed. This seals the inboard end of a central channel portion 216 extending through the seal body 210. At the outboard end of the channel portion, the seal body 210 carries a sealing system 220 including inboard and outboard polymeric, spring-energized, sealing rings and a π-sectioned retaining member. Although the illustrated rings lack the extreme lips of the embodiments of FIGS. 2 and 4, the general configuration may be quite similar. At its outboard end, the seal body has a radially inward-directed annular channel or pocket 222 and, thereafter, a radially outward-directed annular channel or pocket 224 with a radially extending web 226 therebetween. A portion 228 of the seal body beyond the pocket 224 and joining the web 226 at an outboard junction 230 may be shaped generally similar to the seal body halves of FIG. 2 or FIG. 4. The portion 228 thus may include a collar portion 240 accommodated within the channel of the associated retainer of the sealing system 220 and, inboard thereof, a hub 232 with an annular outer surface 234. Engagement of the outer surface 234 with an inward-facing annular surface 235 of the valve body 202 provides a primary seal between the valve body and the seal body with the seal system 220 providing a secondary seal. With the web 226 relatively thin compared with the portion 228, flexion of the web may largely provide the longitudinal compliance biasing both the surface 212 into engagement with the surface 214 and the surface 234 into engagement with the surface 235 while also maintaining compression of the sealing system 220.

Preferably, a counterbore-like pocket in the outer end of the seal body has lateral and base surfaces 240 and 242, respectively. This accommodates a metal stop sleeve 244 with a lateral surface 246 and inner and outer end surfaces 248 and 250. The stop sleeve has a similar compression-limiting role to that of FIG. 4.

One or more embodiments of the present invention have been described. Nevertheless, it will be understood that various modifications may be made without departing from the spirit and scope of the invention. For example, the sealing features may be applied in other applications, such as in ball or other-type valves or in a variety of fluid couplings. Although inboard and outboard rings are shown as having similar cross-sections, different cross-sections than those illustrated may be utilized and dissimilar cross-sections may be utilized in inboard and outboard rings of a given seal. Accordingly, other embodiments are within the scope of the following claims.

What is claimed is:

1. An apparatus for forming a forming a seal between first and second elements, having a central longitudinal axis (500; 510), and comprising:
    a first annular polymeric sealing member (45A; 45B) having a first surface (49A; 49B) for sealingly engaging the first element (110; 106; 202) and a second surface (47A; 47B) for sealingly engaging the second element (22A; 22B; 210);
    a second annular polymeric sealing member (44A; 44B) having a first surface (48A; 48B) for sealingly engaging the first element and a second surface for sealingly engaging the second element;
    an annular retaining member (66A; 66B) having:
        an annular cap portion (67A; 67B) having:
            an inboardmost portion (71A; 71B) covering a portion (62A; 62B) of the first sealing member outboard of the first surface of the first sealing member; and
            an outboardmost portion (72A; 72B) covering a portion (56A; 56B) of the second sealing member inboard of the first surface of the second sealing member; and
        at least one annular collar portion (75A; 75B; 76A; 76B) depending from the cap and directed toward the second element; and
    at least one additional annular collar portion (78A; 78B) formed integrally with the second element, intermeshed with the at least one collar portion of the annular retaining member and projecting toward the cap portion.

2. The apparatus of claim 1 wherein the annular retaining member has first and second such collar members and there is one such additional collar portion radially between the first and second collar members.

3. The apparatus of claim 1 wherein:
    the first element is a valve body (202);
    the second element is a seal body (210) having a first end portion engaging the first and second annular polymeric sealing members and a second end for engaging a valve element shiftable between open and closed conditions respectively unblocking and blocking a channel extending between the first and second ends; and
    proximate the first end, the seal body has an inwardly directed annular channel and an outwardly directed annular channel with a flexible web therebetween biasing the first end portion into engagement with the valve body both directly through a hub portion of the seal body and indirectly through the first and second annular polymeric sealing members.

4. The apparatus of claim 1 wherein the first and second annular polymeric sealing members each comprise: a body comprising PTFE; and a coiled metal core (54A; 54B; 60A; 60B).

5. The apparatus of claim 1 wherein the second element is a first half of a metallic seal body and wherein a second half of said metallic seal body forms a third element, sealed to a fourth element by third and fourth annular polymeric sealing members and a second annular retaining member, respectively identical to the first and second annular polymeric sealing members and annular retaining member.

6. The apparatus of claim 1 wherein the annular retaining member consists essentially of material selected from the group consisting of copper and alloys thereof.

7. An apparatus for forming a forming a seal between first and second elements, having a central longitudinal axis (500; 510), and comprising:
    a first annular polymeric sealing member (45A; 45B) having a first surface (49A; 49B) for sealingly engaging the first element (110; 106; 202) and a second surface (47A; 47B) for sealingly engaging the second element (22A; 22B; 210);
    a second annular polymeric sealing member (44A; 44B) having a first surface (48A; 48B) for sealingly engaging the first element and a second surface for sealingly engaging the second element;
    an annular retaining member (66A; 66B) having:
        an annular cap portion (67A; 67B) having:
            an inboardmost portion (71A; 71B) covering a portion (62A; 62B) of the first sealing member outboard of the first surface of the first sealing member; and
            an outboardmost portion (72A; 72B) covering a portion (56A; 56B) of the second sealing member inboard of the first surface of the second sealing member; and
        at least one annular collar portion (75A; 75B; 76A; 76B) depending from the cap and directed toward the second element.

8. An apparatus for forming a seal between first and second conduits, having a central longitudinal axis and a transverse centerplane, and comprising:
    a first half facing outward from a first side of the transverse centerplane, and comprising:
        a centrally apertured first metal body having:
            an outwardly projecting first hub having an annular outward-facing first engagement surface; and
            a first web extending radially outward from the first hub to a first perimeter and having interior and exterior surfaces; and
    a second half facing outward from a second side of the transverse centerplane opposite the first side, and comprising:
        a centrally apertured second metal body having:
            an outwardly projecting second hub having an annular outward-facing second engagement surface; and a second web extending radially outward from the second hub to a second perimeter and having interior and exterior surfaces;

an annular metal stop sleeve having a first end within the first hub and a second end within the second hub;

wherein the first metal body is secured to the second metal body via an annular weld so that the combination of such metal bodies forms a body of the seal having a longitudinal separation between the first and second engagement surfaces compressible via a flexing of the first and second webs from a relaxed separation to a range of compressed separations in which the first engagement surface is sealingly engaged to the first conduit and the second sealing surface is sealingly engaged to the second conduit so as to form a seal between the first and second conduits and wherein the stop sleeve has a sleeve length less than said relaxed separation, but greater than the combination of a length of the first hub and a length of the second hub.

9. An apparatus for forming a seal between first and second conduits, having a central longitudinal axis and a transverse centerplane, and comprising:

a first half facing outward from a first side of the transverse centerplane, and comprising:
a centrally apertured first metal body having:
an outwardly projecting first hub having an annular outward-facing first engagement surface; and
a first web extending radially outward from the first hub to a first perimeter and having interior and exterior surfaces; and
at least one annular sealing member having:
a polymeric body; and
a coiled metal reinforcement for forming a seal between the first metal body and the first conduit; and a second half facing outward from a second side of the transverse centerplane opposite the first side, and comprising:
a centrally apertured second metal body having:
an outwardly projecting second hub having an annular outward-facing second engagement surface; and
a second web extending radially outward from the second hub to a second perimeter and having interior and exterior surfaces; and
at least one annular sealing member having:
a polymeric body; and
a coiled metal reinforcement for forming a seal between the second metal body and the second conduit;

wherein the first metal body is secured to the second metal body via an annular weld so that the combination of such metal bodies forms a body of the seal having a longitudinal separation between the first and second engagement surfaces compressible via a flexing of the first and second webs from a relaxed separation to a range of compressed separations in which the first engagement surface is sealingly engaged to the first conduit and the second sealing surface is sealingly engaged to the second conduit so as to form a seal between the first and second conduits.

10. The apparatus of claim 9 wherein the first and second halves each comprise:
inboard and outboard such annular sealing members; and
an annular metallic retaining member having an annular cap portion having an inboardmost portion covering a portion of the associated inboard sealing member and an outboard portion covering a portion of the associated outboard sealing member and at least one annular collar portion depending from the cap portion between the associated inboard and outboard sealing members.

11. A seal apparatus in combination with and forming a seal between first and second conduits, the first and second conduits having respective substantially planar first and second conduit surfaces, the seal apparatus having a central longitudinal axis and a transverse centerplane, and comprising:

a first half facing outward from a first side of the transverse centerplane, and comprising:
a centrally apertured first metal body having:
an outwardly projecting first hub having an annular outward-facing first engagement surface; and
a first web extending radially outward from the first hub to a first perimeter and having interior and exterior surfaces;

a second half facing outward from a second side of the transverse centerplane opposite the first side, and comprising:
a centrally apertured second metal body having:
an outwardly projecting second hub having an annular outward-facing second engagement surface; and
a second web extending radially outward from the second hub to a second perimeter and having interior and exterior surfaces;

wherein the first metal body is secured to the second metal body via an annular weld so that the combination of such metal bodies forms a body of the seal having a longitudinal separation between the first and second engagement surfaces compressible via a flexion of the first and second webs from a relaxed separation to a range of compressed separations said flexion providing an outward biasing force which maintains the first engagement surface sealingly engaged to the first conduit surface and the second sealing surface sealingly engaged to the second conduit surface so as to form a seal between the first and second conduits.

12. The combination of claim 11 wherein the seal apparatus is held in a particular such compressed separation which is between 97% and 99% of said relaxed separation.

13. The combination of claim 11 wherein the first and second metal bodies consist essentially of a nickel-based superalloy.

14. The combination of claim 13 wherein the assembled first and second metal bodies have a plating at least on said first and second engagement surfaces selected from the group consisting of gold, silver, copper, and mixtures and alloys thereof and having a thickness of from about one quarter mil to about three mils.

15. The combination of claim 11 wherein the first and second metal bodies consist essentially of a nickel-chromium-molybdenum-niobium alloy.

16. The combination of claim 11 wherein said alloy comprises, by weight percent: nickel 55.0–59.0; chromium 19.0–22.5; molybdenum 7.0–9.5; niobium 2.75–4.0; titanium 1.0–1.7; aluminum 0.35 max.; carbon 0.03 max.; manganese 0.35 max.; silicon 0.20 max.; phosphorus 0.015 max.; sulfur 0.010 max.; and iron balance.

17. The combination of claim 11 wherein the first and second metal bodies consist essentially of a stainless steel.

18. A seal apparatus in combination with and forming a seal between first and second conduits, the apparatus comprising:

a first half facing outward from a first side of a transverse centerplane, and comprising:

a centrally apertured first metal body, formed of a nickel-based superalloy and having:
   an outwardly projecting first hub having an annular outward-facing first engagement surface; and
   a first web extending radially outward from the first hub to a first perimeter and having interior and exterior surfaces;
a second half facing outward from a second side of the transverse centerplane opposite the first side, and comprising:
   a centrally apertured second metal body, formed of a nickel-based superalloy and having:
      an outwardly projecting second hub having an annular outward-facing second engagement surface; and
      a second web extending radially outward from the second hub to a second perimeter and having interior and exterior surfaces;

wherein the first metal body is secured to the second metal body via an annular weld so that the combination of such metal bodies forms a body of the seal having a longitudinal separation between the first and second engagement surfaces compressible via a flexing of the first and second webs from a relaxed separation to a range of compressed separations in which the first engagement surface is sealingly engaged to the first conduit and the second sealing surface is sealingly engaged to the second conduit so as to form a seal between the first and second conduits.

19. The combination of claim 18 wherein the seal body has a plating selected from the group consisting of gold, silver, copper, and mixtures and alloys thereof.

20. The combination of claim 18 wherein the first and second metal bodies are formed of a nickel-chromium-molybdenum-niobium alloy.

\* \* \* \* \*